United States Patent
Chen et al.

(10) Patent No.: US 10,885,031 B2
(45) Date of Patent: Jan. 5, 2021

(54) PARALLELIZING SQL USER DEFINED TRANSFORMATION FUNCTIONS

(71) Applicant: Hewlett Packard Enterprise Development LP, Houston, TX (US)

(72) Inventors: Qiming Chen, Cupertino, CA (US); Maria G. Castellanos, Sunnyvale, CA (US); Meichun Hsu, Los Altos Hills, CA (US); Sharad Singhal, Belmont, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 592 days.

(21) Appl. No.: 15/114,913

(22) PCT Filed: Mar. 10, 2014

(86) PCT No.: PCT/US2014/022879
§ 371 (c)(1),
(2) Date: Jul. 28, 2016

(87) PCT Pub. No.: WO2015/137919
PCT Pub. Date: Sep. 17, 2015

(65) Prior Publication Data
US 2016/0342653 A1    Nov. 24, 2016

(51) Int. Cl.
*G06F 16/24* (2019.01)
*G06F 16/2453* (2019.01)
*G06F 16/2455* (2019.01)

(52) U.S. Cl.
CPC .... *G06F 16/24542* (2019.01); *G06F 16/2456* (2019.01); *G06F 16/24532* (2019.01);
(Continued)

(58) Field of Classification Search
CPC ......... G06F 16/24532; G06F 16/24542; G06F 16/2546
See application file for complete search history.

(56) References Cited

U.S. PATENT DOCUMENTS 5,548,755 A  *  8/1996  Leung .............. G06F 16/24547
6,067,542 A  *  5/2000  Carino, Jr. ........ G06F 16/24532
(Continued)

OTHER PUBLICATIONS

Eric Friedman, "SQL/MapReduce: A practical approach to self-describing, polymorphic, and parallelizable user-defined functions," Aug. 24-28, 2009, <http://www.asterdata.com/resource/assets/sqlmr.pdf>.
(Continued)

*Primary Examiner* — Apu M Mofiz
*Assistant Examiner* — Farhad Agharahimi

(57) ABSTRACT

Example embodiments relate to parallelizing structured query language (SQL) user defined transformation functions. In example embodiments, a subquery of a query is received from a query engine, where each of the subqueries is associated with a distinct magic number in a magic table. A user defined transformation function that includes local, role-based functionality may then be executed, where the magic number triggers parallel execution of the user defined transformation function. At this stage, the results of the user defined transformation function are sent to the query engine, where the query engine unions the results with other results that are obtained from the other database nodes.

16 Claims, 3 Drawing Sheets

(52) U.S. Cl.
CPC .. *G06F 16/24534* (2019.01); *G06F 16/24556* (2019.01); *G06F 16/24565* (2019.01)

(56) References Cited

U.S. PATENT DOCUMENTS

| | | | |
|---|---|---|---|
| 6,289,334 B1* | 9/2001 | Reiner | G06F 16/24532 |
| 6,675,207 B1* | 1/2004 | Mamada | G06F 9/45512 |
| | | | 706/48 |
| 6,760,719 B1 | 7/2004 | Hanson et al. | |
| 8,103,654 B2 | 1/2012 | Gilula | |
| 2002/0078058 A1* | 6/2002 | Bird | G06F 16/2365 |
| 2003/0037048 A1 | 2/2003 | Kabra et al. | |
| 2008/0275891 A1* | 11/2008 | Park | G06F 16/2458 |
| 2009/0164412 A1* | 6/2009 | Bestgen | G06F 16/2471 |
| 2009/0204593 A1 | 8/2009 | Bigby et al. | |
| 2010/0235347 A1* | 9/2010 | Chaudhuri | G06F 16/24542 |
| | | | 707/713 |
| 2012/0191699 A1 | 7/2012 | George et al. | |
| 2013/0166589 A1 | 6/2013 | Baeumges et al. | |
| 2013/0275364 A1 | 10/2013 | Wang et al. | |
| 2015/0149413 A1* | 5/2015 | Lee | G06F 16/23 |
| | | | 707/643 |

OTHER PUBLICATIONS

PCT; "International Search Report" dated May 28, 2015; 3 pages.

\* cited by examiner

PARALLELIZING SQL USER DEFINED TRANSFORMATION FUNCTIONS

BACKGROUND

A query engine can retrieve data from a local database by using table-scans and retrieve raw data or analytics results from external sources using function-scans. A function-scan can be implemented by user defined functions, such as user defined transformation functions (UDTF's) that are configured to read/parse application specific data from external data sources. If a query that accesses a partitioned table is executed by a parallel database engine, the query engine generates a query plan that executes the query and a UDTF on each node in a database cluster; however, the UDTF on each node is prevented from accessing multiple external data sources in parallel because (1) the query engine cannot determine if the external data sources should be processed distinctly and (2) a relevant "table-partition" indication is not provided to the query engine.

BRIEF DESCRIPTION OF THE DRAWINGS

The following detailed description references the drawings, wherein.

DETAILED DESCRIPTION

As detailed above, typical queries of partitioned tables are not parallelized. In order to parallelize such queries for data-integrated analytics, a role-based UDTF design and UDTF instance recognition may be applied that allows the running instances of a UDTF to act differently and collaboratively in retrieving and processing data from multiple external sources. Further, a query parallelizing technique may be provided using a magic table that instructs the query engine to execute a UDTF on multiple nodes for retrieving/analyzing the data from multiple sources in parallel. These techniques allow for parallel query processing to be used for data integrated applications (e.g. obtain analytics results from multiple data layer engines or to aggregate the operational data from multiple operational databases) without modifying the query engine. The role-based UDTF design and run-time peer UDTF role resolution allow a single parallel query to handle various external data sources simultaneously. Further, the magic table may be generalized as a system support for parallelizing UDTF execution.

A UDTF receives one or more parameters that are treated as a row of data and returns rows of data that include column(s). Further, the schema of the output table returned by the UDTF does not need to correspond to the schema of the input table. The UDTF can return any number of output rows in response to each input row.

Generally, embodiments described below (1) support highly dynamic and efficient data-integrated analytics without copying or materializing data; (2) provide the flexibility of retrieving interpretable data that is not in fixed formats such as proprietary database files; and (3) leverage the parallel execution power existing database systems without changing the implementation of their query engines.

Example embodiments disclosed herein provide parallelization of SQL user defined functions. In example embodiments, a subquery of a query is received from a query engine, where each of the subqueries is associated with a distinct magic number in a magic table. A user defined transformation function that includes local, role-based functionality may then be executed, where the magic number triggers parallel execution of the user defined transformation function. At this stage, the results of the user defined transformation function are sent to the query engine, where the query engine unions the results with other results that are obtained from the other database nodes.

In this manner, example embodiments disclosed herein improve parallelization of SQL user defined functions by using a magic table that simulates parallelization metadata. Specifically, the magic table is a parallel table that exists across external sources such that referencing the magic table in a subquery provided to a database node of an external source can force the database node to execute the subquery in parallel.

Figure 1:
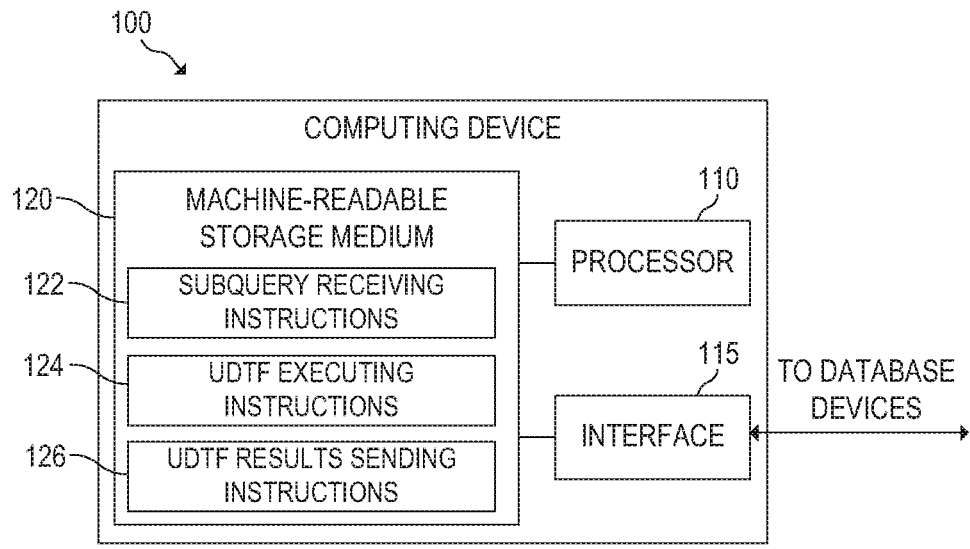
FIG. 1 is a block diagram of an example computing device for parallelizing structured query language (SQL) UDTF's.

Referring now to the drawings, FIG. 1 is a block diagram of an example computing device 100 for parallelizing SQL UDTF's. Computing device 100 may be any computing device (e.g., database server, distributed database, desktop computer, etc.) with access to a distributed database system. In the embodiment of FIG. 1, computing device 100 includes a processor 110, an interface 115, and a machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 122, 124, 126 to parallelize SQL UDTF's, as described below. As an alternative or in addition to retrieving and executing instructions, processor 110 may include one or more electronic circuits comprising a number of electronic components for performing the functionality of one or more of instructions 122, 124, 126.

Interface 115 may include a number of electronic components for communicating with a distributed database system. For example, interface 115 may be an Ethernet interface, a Universal Serial Bus (USB) interface, an IEEE 1394 (Firewire) interface, an external Serial Advanced Technology Attachment (eSATA) interface, or any other physical connection interface suitable for communication with the distributed database system. Alternatively, interface 115 may be a wireless interface, such as a wireless local area network (WLAN) interface or a near-field communication (NFC) interface. In operation, as detailed below, interface 115 may be used to send and receive data to and from a corresponding interface(s) of the distributed database system.

Machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for parallelizing SQL UDTF's.

Subquery receiving instructions 122 receive a subquery from a query engine. The subquery is a query that is nested within a query, where the query engine has divided the query into subqueries that are sent to database nodes similar to and including computing device 100. In this example, each of the subqueries includes a magic number that can be used to determine how each of the subqueries should be executed as described below. In other words, the query engine processes and manages the execution of a query across database nodes in a database cluster by assigning each subquery to a particular database node such as computing device 100. The subquery requests data from a local database partition of computing device 100. With respect to the query engine, computing device 100 is considered an external source that lacks partition information that can be used to parallelize a query of a partitioned table (i.e., computing device 100 does not include a partitioned table). An external source may be defined as a source of data that exists outside a database but is referenced such that the external source can be accessed as if it were a table of the database.

UDTF executing instructions 124 executes a corresponding UTDF using parameters in the subquery. Specifically, a magic number in the subquery is provided as a parameter to the UDTF. Based on the magic number, the UDTF can determine whether the subquery should be executed in parallel. The UDTF uses the magic number to attempt to retrieve a magic tuple associated with computing device 100 from a magic table. The magic table is locally accessible to each database node in the database cluster, where each database node is associated with exactly one magic tuple in the magic table. If the magic tuple is retrieved from the magic table, the UDTF executes and obtains data rows from its local database in parallel with the other database nodes. However, if the magic tuple is not retrieved from the magic table, the UDTF does not attempt to retrieve data rows from its local database.

A role may be assigned to computing device 100 that determines the functionality of computing device's 100 UDTF. Such a role-based UDTF design is designed on that during parallel execution on multiple nodes, the execution instances on different database nodes can fulfill different roles (e.g., read and parse data from different or even hybrid sources, read and parse different portions of the data from a single source, apply different functions to the same data, etc.). In contrast when a parallel query executes on a typical parallel database, the UDTF instance executed on all nodes applies the same function to their local database.

UDTF results sending instructions 126 sends the results of the UTDF to the query engine. For example, the results may be data rows from the local database partition that are requested in the subquery. The data rows are typically distinct to the local database partition (i.e., the data rows are not duplicated in other database partitions of the database cluster). Accordingly, after the query engine has received all the results from the database nodes of the database cluster, the query engine may union the different results to generate a dataset that satisfies the original query.

Figure 2:
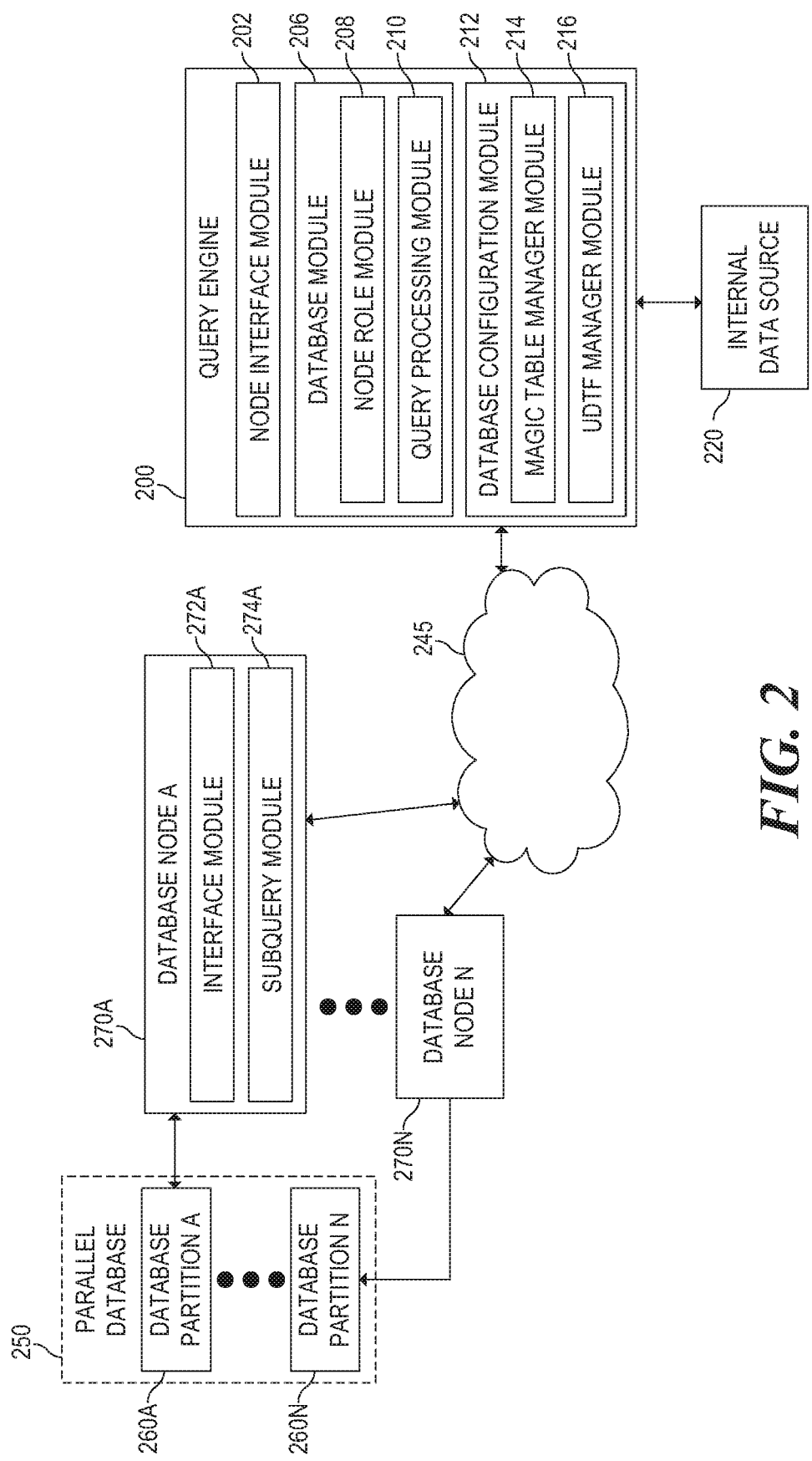
FIG. 2 is a block diagram of an example computing device in communication with database nodes for parallelizing SQL UDTF's.

FIG. 2 is a block diagram of an example query engine 200 in communication with database nodes 270A, 270N via a network 245 for parallelizing SQL UDTF's on parallel database 250. As illustrated, query engine 200 may include a number of modules 202-216. Each of the modules may include a series of instructions encoded on a machine-readable storage medium and executable by a processor of the query engine 200. In addition or as an alternative, each module may include one or more hardware devices including electronic circuitry for implementing the functionality described below.

Similar to computing device 100 of FIG. 1, query engine 200 may be a server, a database server, a desktop computer, or any other device suitable for executing the functionality described below. As detailed below, query engine 200 may include a series of modules 202-216 for parallelizing SQL UDTF's.

Node interface module 202 may manage communications with the database nodes 270A, 270N. Specifically, the node interface module 202 may initiate connections with the database nodes 270A, 270N and then send subqueries and receive query results to/from the database nodes 270A, 270N.

Database module 206 may manage query requests of the database cluster, which includes database nodes 270A, 270N and parallel database 250. While only two database nodes and corresponding database partitions are shown in FIG. 2, any number of database nodes and corresponding database can be included in the database cluster. Further, although the components of database module 206 are described in detail below, additional details regarding an example implementation of module 206 are provided above in connection with instructions 122 and 126 of FIG. 1 from the perspective of a database node.

Node role module 208 may be configured to identify the role of each of the database nodes 270A, 270N. Specifically, node role module 208 may identify the role provided by a database node's associated UTDF so that subqueries may be appropriately allocated to the database nodes 270A, 270N as described below. The role of a database node can be determined using, for example, a magic table that includes a magic number for each of the database nodes 270A, 270N.

Query processing module 210 may process queries for execution on parallel database 250. Query processing module 210 initially processes a query by dividing the query into subqueries. At this stage, query processing module 210 may use node role module 208 to determine which database node (e.g., database node A 270A, database node N 270N) should receive each of the subqueries. In this example, each of the subqueries is sent to the identified database node (e.g., database node A 270A, database node N 270N) for execution in parallel, where query processing module 210 has included a magic number associated with the identified database node in the subqueries. The magic numbers allow each of the database nodes (e.g., database node A 270A, database node N 270N) to execute the common UDTF in parallel; however, each UDTF satisfies a different role and accordingly can provide distinct results. After results are received from all database node 270A, 270N, query processing module 210 can union the results to generate a dataset that satisfies the original query.

Database configuration module 212 may manage the magic tables and UDTF's for the database nodes 270A, 270N. Magic table manager module 214 may be configured to create and manage magic tables in each of the database partitions 260A, 260N for the database nodes 270A, 270N. As described above, the magic table has a magic tuple with a magic number for each database node (e.g., database node A 270A, database node N 270N). Further, the local magic table of a database node (e.g., database node A 270A, database node N 270N) may only include the magic table associated with that database node. The local magic table of a database node is restricted to one magic tuple so that a magic number provided in a subquery by the database module 206 can determine whether the subquery is executed as a UDTF on the database node.

Magic table manager module 214 may also be configured to allow an administrator to initially create and then modify the magic table. For example, the magic table may be modified if database nodes are added or removed from a database cluster. Historically, query engine 200 executes a query in parallel mode if the query is accessing a partitioned table. In this case, the query as well as the hosted UDTF may be scheduled to have multiple running instances on multiple database nodes, which each apply the same function to their local database partition; otherwise, the query by default is scheduled to run on a single database node. However, external data sources like parallel database 250 do not provide relevant table partition indications to query engine 200; thus, the query as well as the hosted UDTF is not parallelized in this case.

The partitioned magic table allows for parallelization by instructing the query engine to run the query as well as the hosted UDTF in parallel. For example, the magic table may be created with the following SQL statement:

create table MagicTable (magic integer PRIMARY KEY NOT NULL) segmented by hash(magic) all nodes;

In this example, MagicTable has only one attribute "magic" with integer type. For a parallel database with N database nodes, the magic table has N rows, where each row has one value. As discussed above, the rows are hash partitioned with one partition per database node, and each partition on a database node has exactly one row (i.e., one magic number). The magic numbers are selected using a heuristic formula to meet the above requirement. For example, a database system with four nodes has the magic numbers 0, 1, 3, and 4. In another example, a database system with 16 nodes has the magic numbers 0, 1, 2, 3, 4, 5, 6, 7, 9, 10, 12, 19, 24, 25, 76, and 101. Once inserted and partitioned to multiple nodes, the magic table should not be updated unless the database system is reconfigured.

With respect the query processing module 210, the following is an example parallelized query:

Select getDbSuggest2('IBM' using parameters servers='awe.company.com:443:news_moreover,awe.company.com:443:news,server.cp.company.com:9100:reuters1', hosts=3) over (partition by magic) FROM MagicTable;

The example query accesses a partitioned table "MagicTable" that instructs the query processing module 210 to execute the query in parallel, and in this manner, the hosted UDTF getDbSuggest2 is executed in parallel with each instance handling the data from an individual database partition (e.g., database partition A 260A, database partition N 260N).

In these examples, the magic number does not participate in any computations and is easily projected out from the query result. The purpose of the magic number is to mislead query engine 200 to execute a query that links to external data sources in parallel.

UDTF manager module 214 may be configured to create and manage role-base UDTF's in the database partitions 260A, 260N. As discussed above, each UDTF satisfies a different role so that the corresponding database node (e.g., database node A 270A, database node N 270N) can obtain results for a portion of the query (i.e., subquery) in parallel. To achieve parallelization, a UDTF with the same name and arguments is created in each database partition, where the contents of the UDTF of each database node (e.g., database node A 270A, database node N 270N) varies based on the node's role.

UDTF's can be configured for inter-nodes parallelism and intra-node parallelism. Inter-nodes parallelism indicates that the UDTF instances, bound to the instances of their hosting subqueries, are executing on separate database nodes to take advantage of multiple computing devices. Intra-node parallelism indicates that the UDTF, regardless of the hosting query, has multiple execution instances on a single computing device to take advantage of multi-cores. As described above, query engine 200 can parallelize a query of external data sources by simulating table partition indications using the magic table (i.e., the magic table triggers parallel execution of UDTF's on the external data sources).

An example of role-based UDTF parallelization may be configured as follows. The UDTF can be designed with (1) a parameter for the address information of a list $L_s$ of database nodes; (2) a parameter for the number K of nodes of the parallel database cluster; (3) functionality for reading the first K node addresses (hostname or IP address) from the system configuration file into a list $L_n$; and (4) functionality for obtaining the local host address A. In this example, the UDTF is designed (1) to find a match of A in $L_n$ and if found, to get the index i of A in $L_n$ and (2) to connect to the database node listed in $L_s$ with index i. This index is referred to herein as role-ID. The valid role-ID should be less than K (e.g., in this example, K is 3 and the role-ID are 0, 1, 2). The UDTF instance running on a node not listed in $L_n$ does not have a valid role-ID.

The above described configuration provides a template for all the executing instances of the UDTF. During execution, a peer UDTF instance will identify its role by obtaining a local host address and if a matched engine can be identified, perform it portion of the work. In this manner, multiple UDTF instances operate in parallel by collaboratively retrieving the data from multiple external servers, which allows for data integrated analytics to be performed using a single parallel query. Generally, the role-based actions can be designed with a function that receives role-ID as an argument or has functionalities case-switched based on the role-ID.

Internal data source 220 may be a local database that is accessible to query engine 200. For example, internal data source 220 may be any hardware storage device for maintaining data accessible to computing device 200. For example, internal data source 220 may include one or more hard disk drives, solid state drives, tape drives, and/or any other storage devices. The storage devices may be located in computing device 200 and/or in another device in communication with computing device 200.

Parallel database 250 may be a database accessible to database nodes in a database cluster. In this case, parallel database includes multiple database partitions 260A, 260N. Also, parallel database 250 is shown as a dashed box because the database partitions 260A, 260N are not co-located but rather may be members of a distributed database system. The database partitions 260A, 260N are external sources that do not provide table partition information to query engine 200 because query engine 200 does not have access to metadata describing external sources. As described above with respect to FIG. 1, database partitions 260A, 260N are external sources with respect to query engine 200. Further, parallel database 250 may be implemented as a storage device similar to the examples described above with respect to internal data source 220.

Each database partition 260A, 260N is associated with a corresponding database node 270A, 270N. In FIG. 2, database node A 270A shows modules 272A-278A, which also exist in database node N 270N but are not shown to simplify the figure. Interface module 272A may manage communications with query engine 200. Specifically, the interface module 272A may receive subqueries from query engine 200 and provide subquery results in response.

Subquery module 274A may manage handle subqueries received from query engine 200. Although the components of subquery module 206 are described in detail below, additional details regarding an example implementation of module 274A are provided above in connection with instructions 124 of FIG. 1.

Subquery module 274A processes queries received from query engine 200. Specifically, subquery module 274A may extract parameters from the subquery, which are then provided to a UDTF. Subquery module 274A may then obtain subquery results from the UDTF and provide them to query engine 200. When extracting the parameters from the subquery, subquery module 274A can use the magic number included in the subquery to determine whether the UDTF should be executed. Alternatively, the determination of whether to execute may be in the UDTF itself, which can initially use the magic number to determine if it should continue execution or return a null result.

Figure 3:
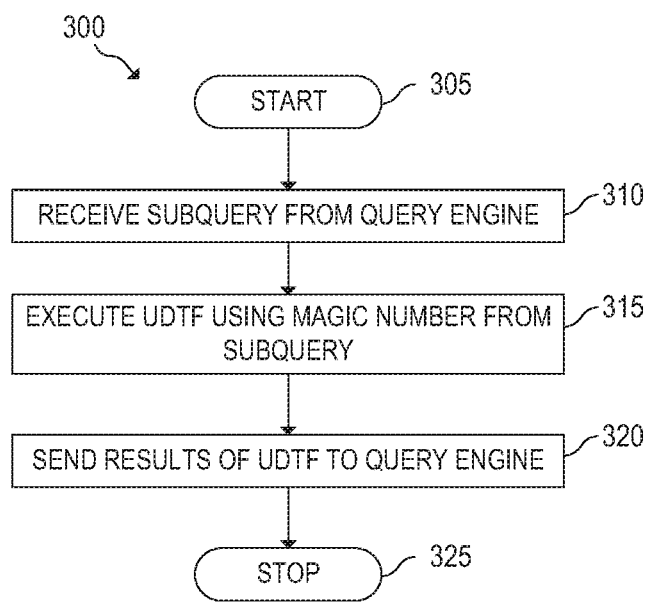
FIG. 3 is a flowchart of an example method for execution by a computing device for executing a parallelized subquery from a query engine.

FIG. 3 is a flowchart of an example method 300 for execution by a computing device 100 for executing a parallelized subquery from a query engine. Although execution of method 300 is described below with reference to computing device 100 of FIG. 1, other suitable devices for execution of method 300 may be used. Method 300 may be implemented in the form of executable instructions stored on a machine-readable storage medium, such as storage medium 120, and/or in the form of electronic circuitry.

Method 300 may start in block 305 and continue to block 310, where computing device 100 receive a subquery from a query engine. The subquery requests data rows from a local database partition of computing device 100, where the local database partition is an external source of the query engine. With respect to the query engine, computing device 100 is considered an external source that lacks partition information that can be used to parallelize a query of a partitioned table (i.e., computing device 100 does not include a partitioned table).

In block 315, a UTDF associated with computing device 100 is executed using parameters in the subquery, which includes a magic number provided by the query engine. If the UTDF is able to retrieve the magic tuple from the magic table using the magic number, the UDTF executes and obtains data rows from its local database in parallel with other database nodes. In block 320, the subquery results obtained from the UDTF are sent to the query engine, which can then union the subquery results with results from other database nodes. Method 300 may then continue to block 325, where method 300 may stop.

Figure 4:
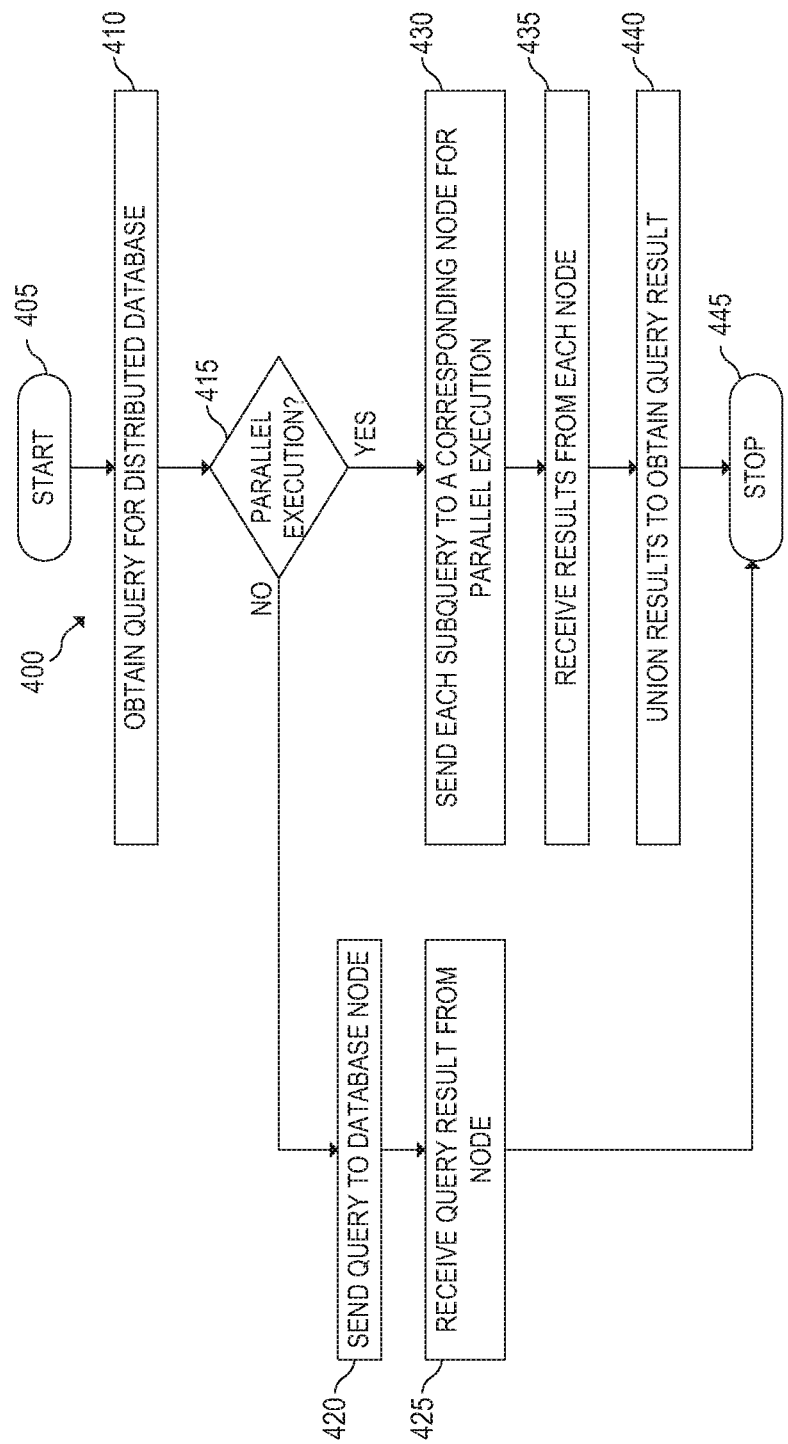
FIG. 4 is a flowchart of an example method for execution by a query engine for parallelizing SQL UDTF's.

FIG. 4 is a flowchart of an example method 400 for execution by a query engine 200 for parallelizing SQL UDTF's. Although execution of method 400 is described below with reference to query engine of FIG. 2, other suitable devices for execution of method 400 may be used. Method 400 may be implemented in the form of executable instructions stored on a machine-readable storage medium and/or in the form of electronic circuitry.

Method 400 may start in block 405 and continue to block 410, where query engine 200 obtains a query for a distributed database. For example, the distributed database may include both local and external databases, where the databases can include database partitions that are clustered. In block 415, query engine 200 determines if parallel execution should be used for the query. Specifically, query engine may search for keywords that indicate that the query is using a magic table (e.g., "(partition by magic) FROM MagicTable"). If the query should not be executed in parallel, the query is sent to a database node in the typical fashion in block 420. The database node can then execute the query and provide query results, which are received in block 425.

If this query should be executed in parallel, query engine 200 sends a subquery to each of the database nodes for execution in parallel in block 430. The subqueries are then used by the database nodes to obtain subquery results from a common UDTF in parallel, where the subquery results are received by query engine in block 435. As described above, the common UDTF provides role based functionality depending on a magic number that is returned from a partitioned magic table at each database node. In block 440, the subquery results from the database nodes is unioned and then provider to the requester. Method 400 then proceeds to block 460, where method 400 may stop.

The foregoing disclosure describes a number of example embodiments for parallelizing SQL UDTF's. In this manner, the embodiments disclosed herein enable parallel queries to be performed on external sources by using a partitioned magic table that simulates table partitioning metadata.

We claim:

1. A database node comprising:
   a processor; and
   a memory storing instructions executable to cause the processor to:
      receive a subquery of a plurality of subqueries from a query engine, wherein each of the plurality of subqueries is associated with one of a plurality of distinct magic numbers in a magic table managed by the query engine, wherein the plurality of distinct magic numbers are used by the query engine to trigger the database node and other database nodes in a database system to execute the plurality of subqueries in parallel;
      in response to a receipt of the subquery, determine whether the subquery includes a particular magic number associated with the database node;
      in response to a determination that the subquery includes the particular magic number, execute the subquery and a user defined transformation function on the database node in parallel with the other database nodes in the database system, to obtain data from a local database of the database node; and
      send results of the user defined transformation function to the query engine, wherein the query engine unions the results from the database node with other results that are obtained from the other database nodes.

2. The database node of claim 1, wherein the subquery specifies the particular magic number in a partition by clause that references the magic table, and wherein the partition by clause identifies the subquery for execution in parallel on the database node.

3. The database node of claim 2, wherein the magic table is a partitioned table that comprises a magic tuple of a plurality of magic tuples that is associated with the particular magic number.

4. The database node of claim 1, wherein the database node is an external source of the query engine.

5. The database node of claim 4, wherein the magic table simulates table partitioning metadata for a parallelizing execution of the subquery on the database node.

6. A method for parallelizing structured query language (SQL) user defined transformation functions, the method comprising:

processing, by a processor of a computing device, a query to obtain a plurality of subqueries, wherein each of the plurality of subqueries is associated with a magic number of a plurality of distinct magic numbers in a magic table, and wherein the plurality of distinct magic numbers in the magic table are used to trigger a plurality of database nodes in a database system to execute the plurality of subqueries in parallel;

inserting, by the processor, the plurality of distinct magic numbers into the plurality of subqueries associated with the plurality of distinct magic numbers;

sending, by the processor, each of the plurality of subqueries to one of the plurality of database nodes, wherein the plurality of database nodes are caused to detect the plurality of distinct magic numbers in the plurality of subqueries and, in response to detecting the plurality of distinct magic numbers, execute the plurality of subqueries in parallel to obtain data from local databases of the plurality of database nodes; and in response to receiving a plurality of results from the plurality of database nodes for the plurality of subqueries, unioning, by the processor, the plurality of results to generate a dataset for the query.

7. The method of claim 6, wherein the query comprises a partition by clause that references the magic table, and wherein the partition by clause identifies the query for execution in parallel on the plurality of database nodes.

8. The method of claim 7, wherein the magic table comprises a magic tuple of a plurality of magic tuples that is associated with a database node of the plurality of database nodes.

9. The method of claim 8, wherein the magic tuple is used by the database node to identify the magic number as an argument to a user-defined transformation function for obtaining one of the plurality of results.

10. The method of claim 6, wherein at least one database node of the plurality of database nodes is an external source.

11. The method of claim 10, wherein the magic table simulates table partitioning metadata for a parallelizing execution of one of the subqueries on the external source.

12. A non-transitory machine-readable storage medium storing instructions executable by a processor for parallelizing structured query language (SQL) user defined transformation functions, wherein the instructions are executable to cause the processor to:

process a query to obtain a plurality of subqueries, wherein each of the plurality of subqueries is associated with a magic number of a plurality of distinct magic numbers in a magic table, and wherein the plurality of distinct magic numbers in the magic table are used to trigger a plurality of database nodes in a database system to execute the plurality of subqueries in parallel;

insert the plurality of distinct magic numbers into the plurality of subqueries associated with the plurality of distinct magic numbers;

send each of the plurality of subqueries to one of the plurality of database nodes, wherein the plurality of database nodes are caused to detect the plurality of distinct magic numbers in the plurality of subqueries and, in response to detecting the plurality of distinct magic numbers, execute the plurality of subqueries in parallel using a local, role-based version of a user defined transformation function to obtain data from local databases of the plurality of database nodes; and in response to receiving a plurality of results from the plurality of database nodes for the plurality of subqueries, union the plurality of results to generate a dataset for the query.

13. The non-transitory machine-readable storage medium of claim 12, wherein the query comprises a partition by clause that references the magic table, and wherein the partition by clause identifies the query for execution in parallel on the plurality of database nodes.

14. The non-transitory machine-readable storage medium of claim 12, wherein at least one database node of the plurality of database nodes is an external source.

15. The non-transitory machine-readable storage medium of claim 14, wherein the magic table simulates table partitioning metadata for a parallelizing execution of one of the subqueries on the external source.

16. The non-transitory machine-readable storage medium of claim 12, wherein the magic table is a partitioned table that comprises a plurality of magic tuples, and wherein each of the plurality of magic tuples is associated with one of the plurality of distinct magic numbers.

* * * * *